United States Patent [19]
Dellinger

[11] 3,883,994
[45] May 20, 1975

[54] PROFILE GRINDING APPARATUS

[76] Inventor: Charles L. Dellinger, 1110 Alexander St., Statesville, N.C. 28677

[22] Filed: Nov. 12, 1973

[21] Appl. No.: 414,740

[52] U.S. Cl. .......... 51/34 C; 51/100 R; 51/166 MH; 90/13.3; 29/560; 144/1 C
[51] Int. Cl. ............................................ B24b 17/00
[58] Field of Search........ 51/34 A, 34 C, 48, 50 PC, 51/100 R, 101 R, 166 R, 166 MH; 144/1 C; 408/20, 21; 29/560; 90/13.2, 13.3

[56] References Cited
UNITED STATES PATENTS

| | | | |
|---|---|---|---|
| 2,409,415 | 10/1946 | Blomquist | 51/34 C |
| 2,624,242 | 1/1953 | Eberle et al. | 51/100 R |
| 2,741,072 | 4/1956 | Pruitt | 51/101 R |
| 2,835,289 | 5/1958 | Rockwell | 144/1 C |
| 2,999,519 | 9/1961 | Petersen | 144/1 C |

*Primary Examiner*—Al Lawrence Smith
*Assistant Examiner*—K. J. Ramsey

[57] ABSTRACT

A precision profile machine for making tools and dies for the metal and woodworking industries including a grinding head pivotally displaceable at least 180° so as to be selectively positioned above or below the work piece. The grinding wheel spindle and the tracing stylus remain in alignment with each other during pivotable displacement of the grinding wheel to positions above or below the work piece.

9 Claims, 11 Drawing Figures

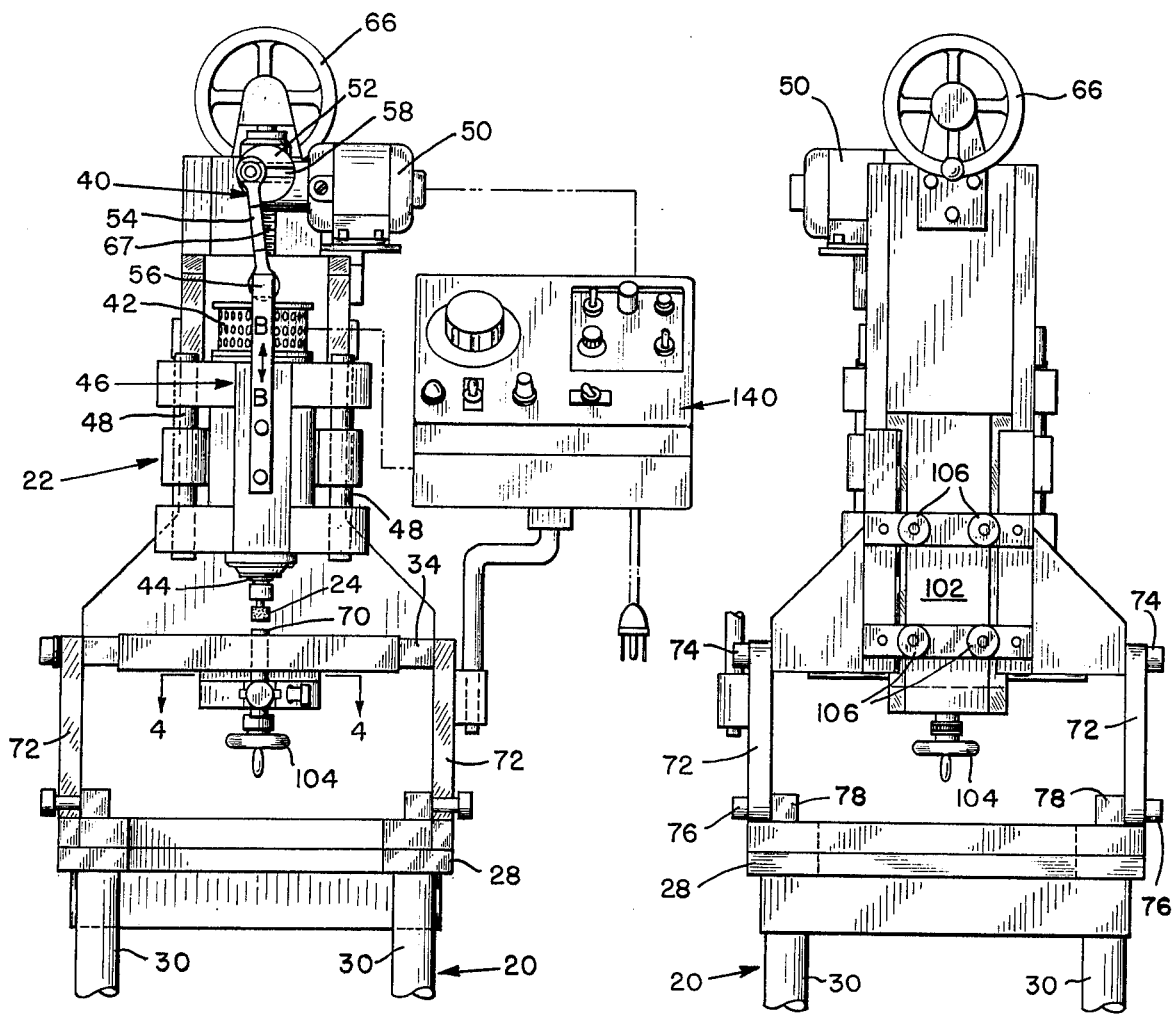
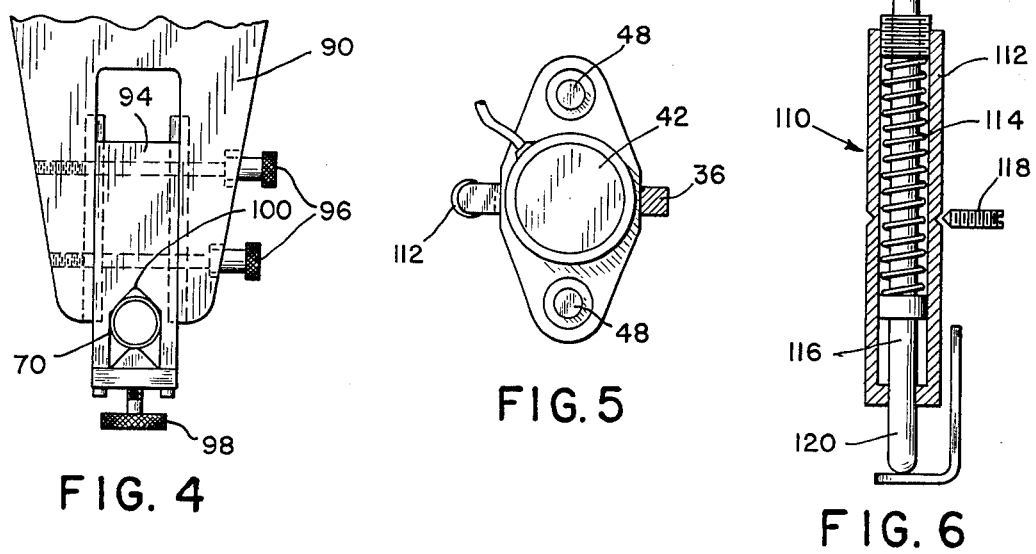
FIG. 2  FIG. 3  FIG. 4  FIG. 5  FIG. 6

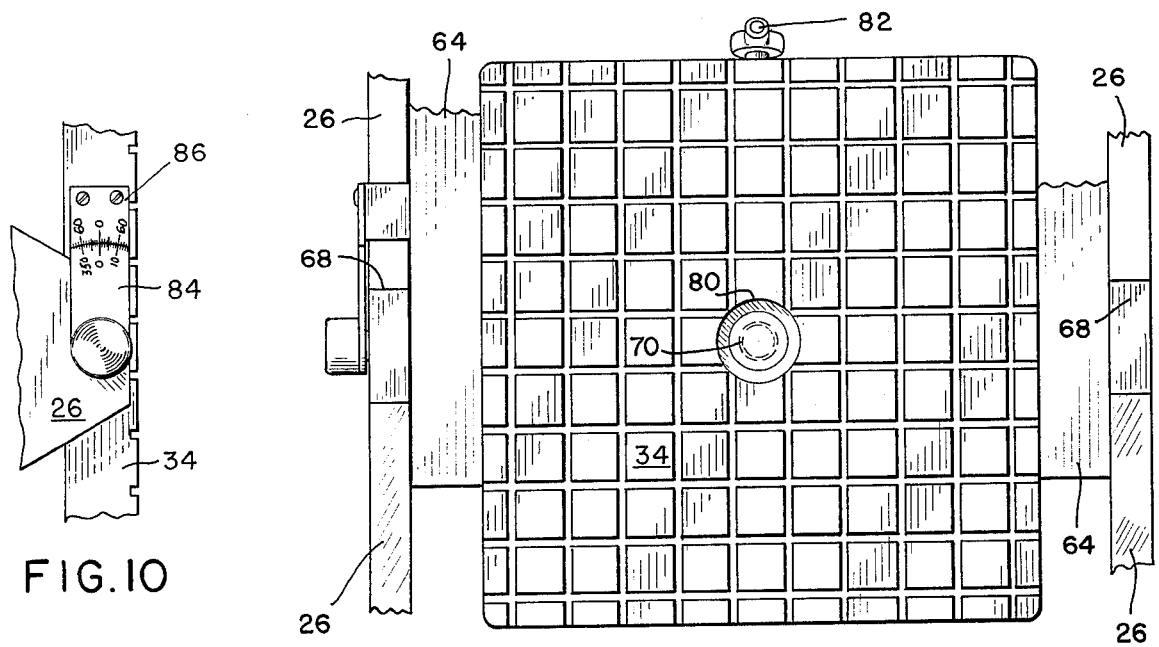
FIG. 10
FIG. 7
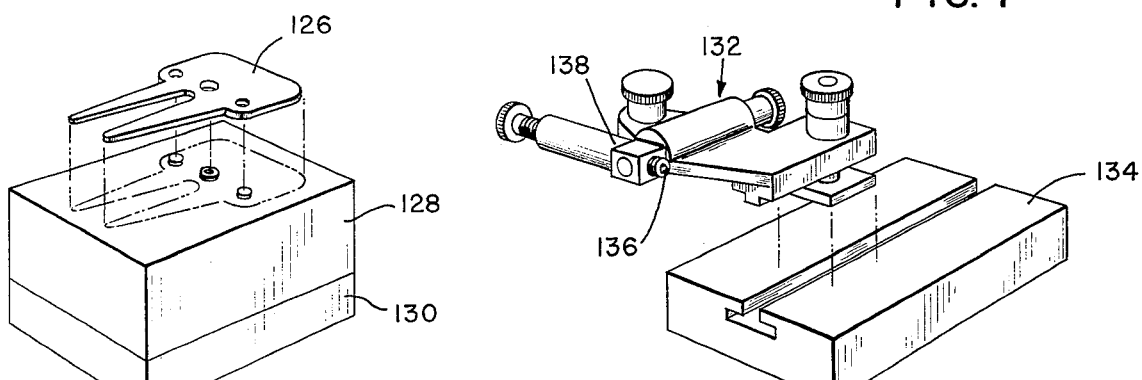
FIG. 9
FIG. 8
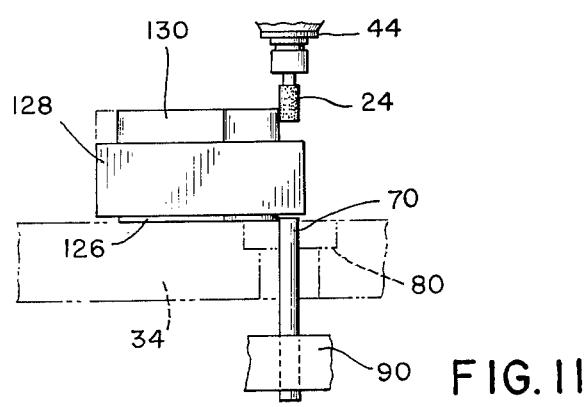
FIG. 11

PROFILE GRINDING APPARATUS

BRIEF SUMMARY AND OBJECTS OF THE INVENTION

This invention relates generally to profile grinders, and more particularly to a new and improved precision profile grinder in which the grinding head can be positioned above or below the work piece to produce tools, dies, etc., for metal as well as woodworking industries.

A pivotable frame assembly, rotatable 180 degrees, permits under and over positioning of the grinder head and also permits the grinder head spindle and tracing stylus to remain in alignment with each other whether the stylus is located above or below the double sided work table. A tracing attachment, which supports the stylus, is adjustable vertically depending upon the over or under positioning of the attachment, the size of the pattern, etc.

The grinding head reciprocates upon the parallel, fixed shafts for rigidity and accuracy in alignment with the stylus. The head is capable of accelerating 1/8 inches, rather than the 1/8 inch to 3/16 inch normally required for profile grinding. The extra travel permits the grinding head to be replaced with a slot grinding attachment to facilitate the grinding of internal sharp corners.

A balancing mechanism also is provided which results in smooth, easy oscillation of the grinding head.

One of the primary objects of the invention is the provision of a new and improved profile grinding apparatus.

Another object of the invention is the provision for adjustably positioning the grinding head above or below a work piece while maintaining the alignment of the grinding head spindle with a stylus.

A further object of the invention is the provision of a grinding machine of simple construction and requiring minimum skill and operation.

Other objects and advantages of the invention will become apparent when considered in view of the following detailed description.

BRIEF DESCRIPTION OF THE DRAWING

FIG. 2 is a fragmentary, front elevational view of the profile grinder of the present invention illustrating the grinding tool supporting, driving and reciprocating assembly mounted above the work table;

FIG. 3 is a fragmentary, rear elevational view of the grinding machine of the present invention;

FIG. 4 is a view taken along line 4—4 of FIG. 2 and illustrating the stylus holder;

FIG. 5 is a view taken along line 5—5 of FIG. 1;

FIG. 6 is an enlarged, side elevational view, partly in section, of the balancer assembly;

FIG. 7 is enlarged plan view of one side of the work table;

FIG. 8 is a perspective view of a dressing wheel attachment adapted to be mounted upon the slide block which, in turn, is positioned upon the work table;

FIG. 9 is a perspective view illustrating the positioning of a pattern upon one side of a spacer block, the work piece to be ground being positioned upon a side of the spacer block opposite the pattern;

FIG. 10 is an enlarged, fragmentary end elevational view of the work table and pivotable support means rotated approximately 90 degrees from the FIG. 1 position; and FIG. 11 is a schematic, fragmentary, elevational view of the apparatus illustrating the positioning of a pattern, work piece and spacer relative to the tracer and grinding tool.

DETAILED DESCRIPTION OF THE INVENTION

Figure 1:
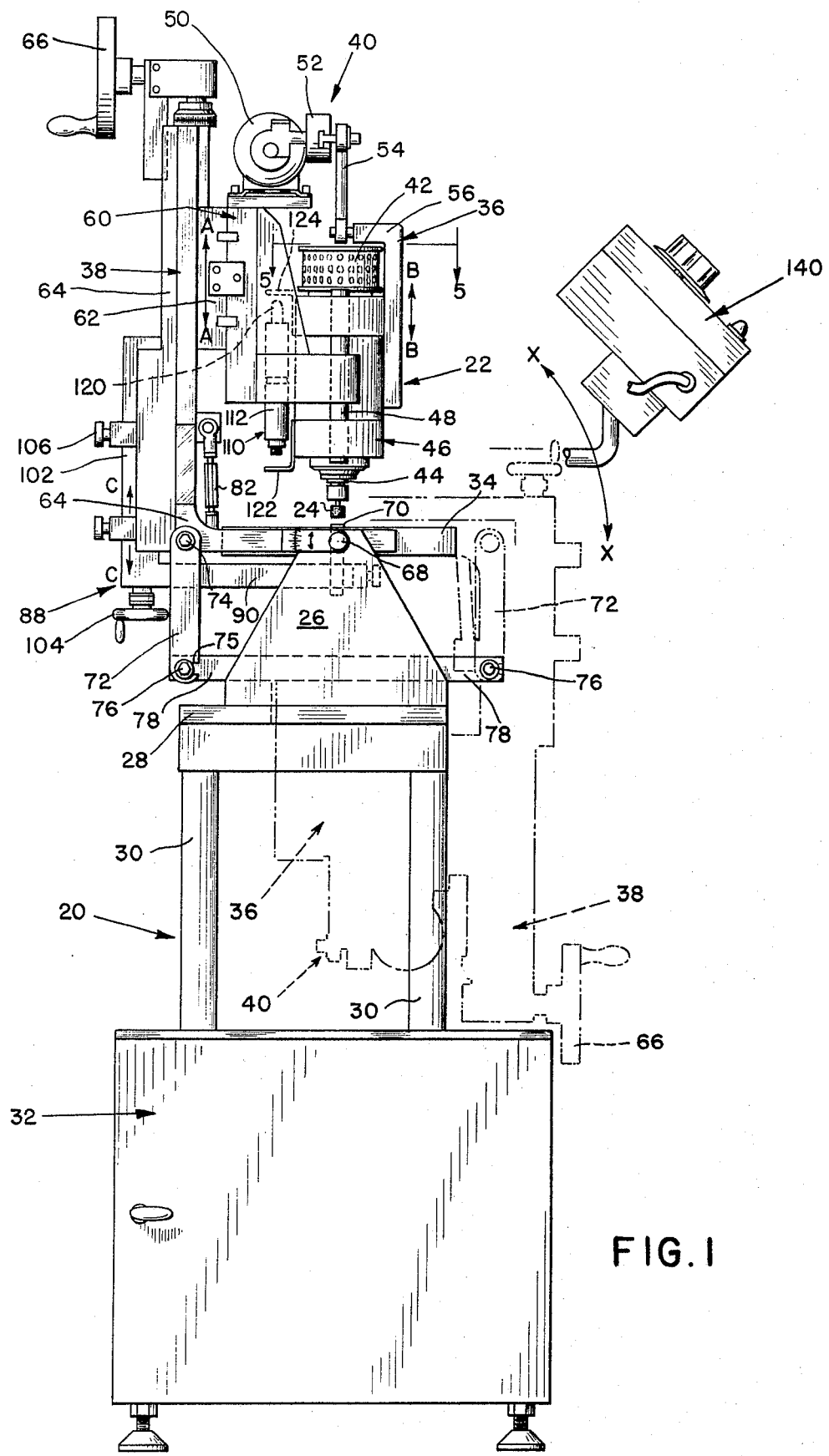
FIG. 1 is a side elevational view of the profile grinding machine of the present invention illustrating the grinding tool supporting, driving and reciprocating assembly mounted above the work table, as shown in full lines, and capable of being pivoted to the broken line position with the grinding tool supporting, driving and reciprocating assembly located below the table.

Referring to the drawing, and particularly to FIG. 1, the invention includes a base structure 20 which supports a grinding assembly 22 for rotating and reciprocating a work tool such as a grinding wheel 24.

The base structure includes a pair of laterally spaced standards 26, supported upon plate 29 which, in turn, is supported by uprights 30 and a cabinet structure 32.

The grinding assembly 22 includes a head 36 which is displaceable vertically relative to the support frame 38, as shown by the arrows A, A of FIG. 1, a drive assembly 40 for reciprocating the head assembly and a motor 42 for driving a grinding wheel 24. The motor 42 and the grinding wheels supporting chuck 44 are mounted upon a slide 46 which is reciprocated generally vertically as shown by the arrows B, B upon guide member 48 by the drive assembly 40.

The drive assembly 40 includes a motor 50 which rotates a disk 52, FIGS. 1 and 2, having one end of a crank 54 attached thereto. The other end of the crank 54 is pivoted to element 56 of the slide 46. The crank 54 is adjustably attached to the disk 52, being selectively positionable within the slot 58 to vary the length of stroke of head 36 and grinding wheel 24. The motor 50 is secured to a bracket assembly 60 which includes member 62 which forms a dovetailed slide with member 64 of the support frame 38. A hand wheel 66, through a suitable conventional means including screw 67, is adapted to vertically, selectively position the grinding assembly 22 relative to the work table 34.

The work table 34 and the entire grinding assembly 22 and support frame 38 are adapted to be rotated 180° about the pivots 68 in the direction of arrow X which is supported by the laterally spaced standards 26. The pivot 68 also supports the work table 34 for 180° pivotable displacement. In the full line position of FIG. 1, the support frame 38, drive assembly 40 and head assembly 36 are located above a work piece on the work table 34. In this position, the tracer or stylus 70 is located below the grinding wheel 24. In the broken line position of FIG. 1, the support frame 38, drive assembly 40 and head assembly 36 are located below the work table 34 and the stylus 70 would be positioned above the grinding wheel 24. The support frame 38 is rigidly secured in either of the two positions by a plurality of links 72, a link being provided on each side of the work table 34. In the embodiment illustrated, each link 72 is pivotably supported adjacent one end upon the member 64 of the support frame 38 by a fastener 74 and the opposite end is slotted at 75 and releasably engages a fastener 76. The fastener 76 is located adjacent the ends of a plate or spaced bars 78 rigidly secured to the base structure 20. Normally the fasteners 76 are tightened to retain the support frame 38 in a fixed position relative to the base structure 20, but may be loosened to permit pivotable displacement of the links from the fasteners 76 and 180° rotation of the support frame 38, drive mechanism 40 and head assembly 36 relative to the base 20. After rotation, the links again are connected to the fasteners 76 and the fasteners 76 tightened.

Each side of the work table 34 serves as a work supporting surface, depending upon the positioning of the head 36 relative thereto. In the embodiment illustrated, the work table generally is square and defines a central opening 80. The opening is adapted to receive the stylus 70 or the grinding wheel 24. Opposite work supporting sides of the table may be smooth, grooved or slotted, as required. Normally the work table 34 is coupled to the support frame 38 for rotation therewith such that one side of the table is presented as a work surface when the head 36 is above the work, and the opposite side of the table is presented as a work surface when the head assembly 36 is pivoted to the position below the table. A turn buckle 82 has one end attached to the work table and the opposite end attached to the support frame 38. Upon rotation of the turn buckle 82, the angular relationship of the work table relative to the support frame 38 and the head assembly 36 may be varied to permit grinding of work pieces at selected angles. Indicia 84 and 86, FIG. 10, may be provided on the laterally spaced standards and the work table, respectively, if desired, to serve as a guide in adjusting the angular relationship of the work table with respect to the head assembly 36.

A tracing attachment 88, which supports the stylus 70, includes an elongated arm 90 having a universal stylus holder 92, FIG. 4, at the outer end portion and is adapted to position a stylus 70 such that it is in alignment with the work table opening 80. A slide 94 is adjustably secured longitudinally of the arm 90 by lock screws 96 and a fastener 98 clamps the stylus within the V-shaped notch 100 of the slide 94.

The tracing attachment elongated arm 90 is attached to a slide member 102 retained by and displaceable relative to the support frame 38. Upon rotation of the hand wheel 104, the slide member 102, elongated arm 90 and tracing attachment 88 are displaced vertically by conventional means, not shown, in the direction of the arrows, C, C. Once the arm 90 has been positioned at a selected location, it is locked in position by locking screws 106. The vertical adjustment of the tracing attachment allows for work of different sizes and for different types and sizes of stylus. Since the tracing attachment 88 and the spindle of head assembly 36 and the shaft of the grinding wheel 24 are mounted upon a common base, member 64, the actual alignment between the grinding wheel and the stylus remain accurate regardless of whether the head is located above or pivoted to a position below the work table 34 and work piece.

To provide for smooth, easy oscillating movement of the head assembly 36, a balance mechanism 110 is attached to the bracket assembly 60. The balance mechanism includes a cylinder 112 housing a spring 114 and a plunger 116. The cylinder is releasably secured to the assembly 60 by a fastener 118. The cylinder 112 may be turned 180° such that the plunger portion 120 extends upwardly or downwardly depending upon whether the head assembly is positioned above or below the table 34. A pair of stop members 112, 124 are fixed to the oscillating slide 46 for engaging the plunger portion 120. As the slide 46 moves downwardly during oscillation, whether positioned above or below the table 34, either stop member 122 or 124 will engage the plunger and partially compress the spring 114 thereby at least partially supporting the weight of the slide 46, motor 42, etc.

FIGS. 9 and 11 illustrate one method of grinding wherein a pattern 126 is fixedly positioned relative to a spacer block 128 which has a work piece 130 secured thereto. The pattern 126 is directed around the stylus 70 and since the oscillating grinding wheel 24 and the stylus 70 are axially aligned, the grinding wheel removes material from the work piece 130 to form a member or tool having the same configuration as the pattern 126.

FIG. 8 illustrates a grinding wheel dressing attachment 132 which includes a slide block 34 adapted to be mounted upon the work table 34. A diamond point 136 is supported within the holder 138.

Motors 42 and 50 are controlled from the control assembly 140. Means, not shown, may be provided for initial fine adjustment of the stylus and grinding wheel.

I claim:

1. A machine for shaping a surface of a work piece comprising; a base structure, a support frame mounted upon said base structure, a head assembly displaceable upon said support frame, a work table for supporting a work piece, a shaping tool having an axial shaft mounted in said head assembly and adapted to be placed in working relation to a work piece, follower means mounted upon said support frame and adapted to engage a template attached to the work piece, said follower means including an axially aligned stylus displaceable with said shaping tool, means mounting said head assembly for rotation between positions above and below a work piece located upon said work table, and means for axially moving said tool independently of said stylus.

2. A machine as recited in claim 1, and further including means adjustably mounted said head assembly and said follower means upon said support frame.

3. A machine as recited in claim 1, wherein said support frame is capable of rotation to simultaneously displace said head assembly and said follower means relative to said base structure.

4. A machine as recited in claim 3, wherein said stylus and said shaping tool are maintained in axial alignment during rotation of said head assembly and said follower means.

5. A machine as recited in claim 1, and further including means for oscillating said head assembly and shaping tool relative to said support frame.

6. A machine as recited in claim 5, and further including a balancing assembly for intermittently applying a biasing force to said oscillating head assembly.

7. A machine as recited in claim 6, and further including means for releasably securing said balancing means upon said support frame.

8. A machine as recited in claim 1, and further including means for effecting rotation of said work table upon rotation of said head assembly between locations above or below said work table.

9. A machine as recited in claim 8, wherein said means for effecting rotation of said work table includes means for angularly adjusting said work table relative to said base structure, said support frame and said head assembly.

* * * * *